United States Patent
Dalsgaard et al.

(10) Patent No.: US 9,585,130 B2
(45) Date of Patent: Feb. 28, 2017

(54) METHOD AND APPARATUS FOR UPLINK COMMUNICATION

(75) Inventors: Lars Dalsgaard, Oulu (FI); Jussi-Pekka Koskinen, Oulu (FI); Esa Malkamäki, Espoo (FI); Ilkka Keskitalo, Oulu (FI); Jarkko Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 261 days.

(21) Appl. No.: 14/376,849

(22) PCT Filed: Feb. 6, 2012

(86) PCT No.: PCT/FI2012/050110
§ 371 (c)(1),
(2), (4) Date: Aug. 6, 2014

(87) PCT Pub. No.: WO2013/117798
PCT Pub. Date: Aug. 15, 2013

(65) Prior Publication Data
US 2014/0348107 A1    Nov. 27, 2014

(51) Int. Cl.
*H04W 72/04* (2009.01)
*H04W 52/02* (2009.01)

(52) U.S. Cl.
CPC ..... *H04W 72/0413* (2013.01); *H04W 52/0251* (2013.01)

(58) Field of Classification Search
None
See application file for complete search history.

(56) References Cited

U.S. PATENT DOCUMENTS

| | | | | |
|---|---|---|---|---|
| 2009/0181712 A1* | 7/2009 | Xu | ........................ | H04L 1/0026 455/522 |
| 2009/0239525 A1* | 9/2009 | Cai | ........................ | H04L 1/1829 455/424 |
| 2009/0316662 A1* | 12/2009 | Yagihashi | ............. | H04L 1/0026 370/335 |
| 2013/0039319 A1* | 2/2013 | Shi | ........................ | H04L 5/0023 370/329 |

* cited by examiner

*Primary Examiner* — Wei Zhao
*Assistant Examiner* — Ronald H Davis
(74) *Attorney, Agent, or Firm* — Seppo Laine Oy

(57) ABSTRACT

In accordance with an example embodiment of the present invention, there is provided an apparatus, comprising a transmitter configured to transmit uplink control information, at least one processing core configured to control the transmission of uplink control information, wherein the at least one processing core is configured to suppress the transmission responsive to an absence of user data transmission, wherein the suppression occurs while a connection is being maintained in an active state. The uplink control information may comprise, for example, a channel quality indicator CQI and/or a sounding reference signal, SRS.

13 Claims, 4 Drawing Sheets

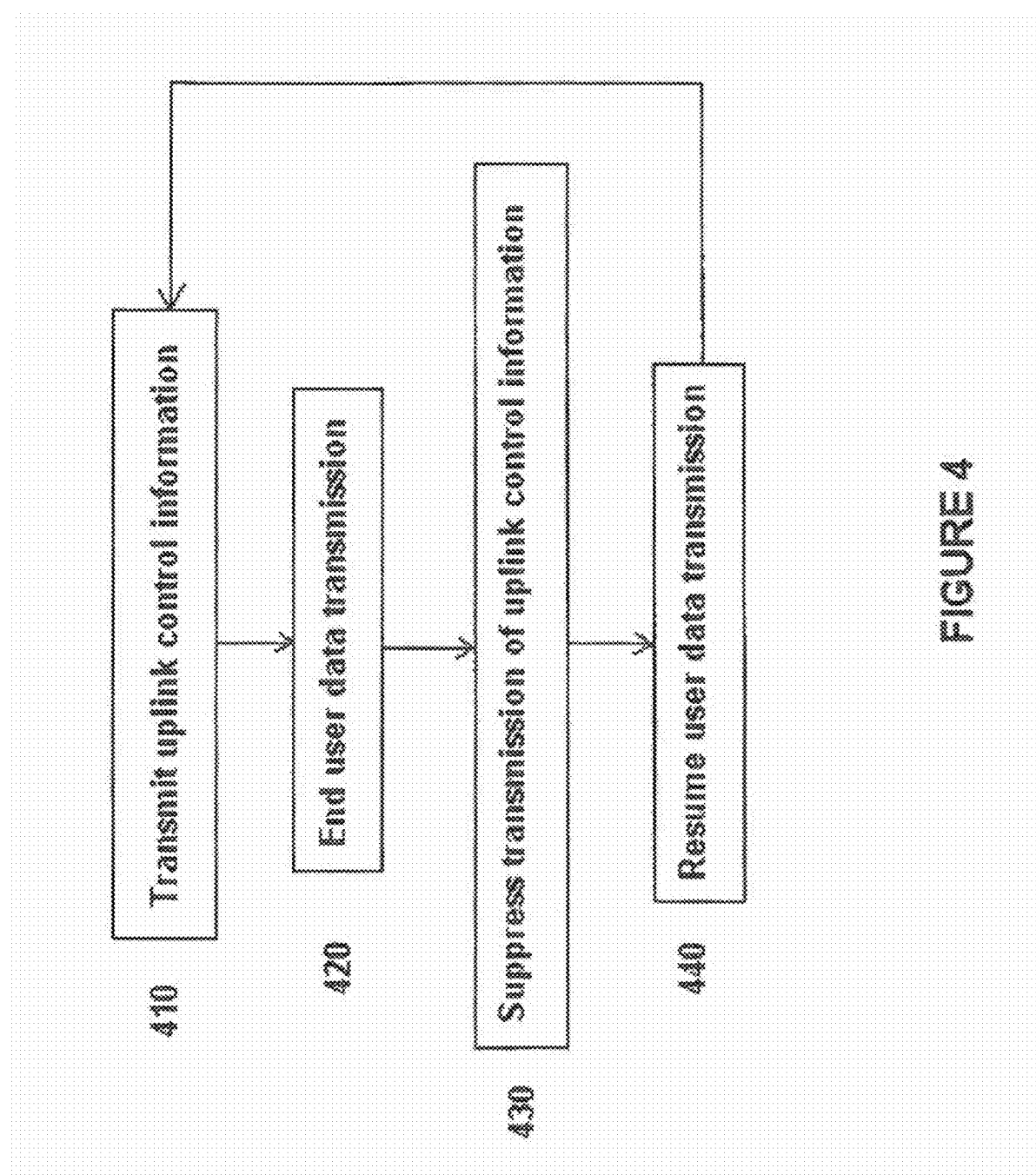

METHOD AND APPARATUS FOR UPLINK COMMUNICATION

TECHNICAL FIELD

The present application relates generally to managing connections and power consumption in wireless communications.

BACKGROUND

Wireless communication may require the use of radio connections, and in case one of the communication endpoints is mobile, such as a mobile telephone, wireless communication is conducted using battery power. As mobile wireless communication devices, such as cellphones, laptop computers, tablet computers, personal digital assistants and the like, become more complex they tend to draw on more battery power. For example, a large colour display consumes more power than a smaller monochrome display. Likewise a faster data connection, or a data connection that is continuously open, consumes more power than a slower connection, or one that is only intermittently open.

Continuously connected services, for example email, chat, notification and presence services, may preferably have access to a connection that is always open. An open connection in this context refers to a connection that needn't be separately established using a connection or bearer establishment procedure, for each data unit sent over the connection. Thus an application running on a tablet computer, for example, may request a connection that remains open for several hours at a time.

Maintaining a connection in an open state in wireless communication may require that data is exchanged between the wireless communication endpoints, for example at periodic intervals, to ensure that both endpoints are still participating in the connection and that receivers are able to follow changes in a radio channel between the communication endpoints. For example, in cellular communications the base station and mobile terminal may need to maintain power control and channel estimation in order to keep a radio bearer interconnecting them in an active mode. Information exchanged to maintain a connection in an open state may be referred to as control information.

Transmitting control information to maintain a connection in an open state involves drawbacks. For example, transmitting control information from a mobile terminal consumes battery power, and transmitting control information from a base station consumes energy. A base station may have access to a stable power supply, but energy may still be subject to charge. Exchanging control information over an air interface between a mobile terminal and a base station consumes air interface resources. In code division multiple access, CDMA, schemes, the exchange of control information also raises the interference level in the cell, causing all mobile terminals attached to the cell to increase their transmit power. This in turn increases battery drain in said all mobile terminals.

SUMMARY

Various aspects of examples of the invention are set out in the claims.

According to a first aspect of the present invention, there is provided an apparatus, comprising a transmitter configured to transmit uplink control information, at least one processing core configured to control the transmission of uplink control information, wherein the at least one processing core is configured to suppress the transmission responsive to an absence of user data transmission, wherein the suppression occurs while a connection is being maintained in an active state.

According to a second aspect of the present invention, there is provided a method, comprising transmitting uplink control information, and controlling the transmission of uplink control information, wherein controlling comprises suppressing the transmission responsive to an absence of user data transmission, wherein the suppression occurs while a connection is being maintained in an active state.

According to a third aspect of the present invention, there is provided an apparatus, comprising at least one processor, at least one memory including computer program code the at least one memory and the computer program code configured to, with the at least one processor, cause the apparatus to transmit a signaling message to a user equipment, the signaling message being configured to cause the user equipment to suppress or cease suppressing transmission of uplink control information responsive to an absence of user data to be transmitted from or to the user equipment, wherein the apparatus is configured to transmit the signaling message responsive to configuration information indicating the apparatus is at least one of a base station of a small cell and a base station controller of a small cell.

According to further aspects of the invention, there are provided further methods and computer programs configured to cause methods falling within the scope of the invention to be performed, when run.

BRIEF DESCRIPTION OF THE DRAWINGS

For a more complete understanding of example embodiments of the present invention, reference is now made to the following descriptions taken in connection with the accompanying drawings in which:

FIG. 4 is a flowchart of a method in accordance with an example embodiment of the invention.

DETAILED DESCRIPTION OF THE DRAWINGS

An example embodiment of the present invention and its potential advantages are understood by referring to FIGS. 1 through 4 of the drawings.

Figure 1:
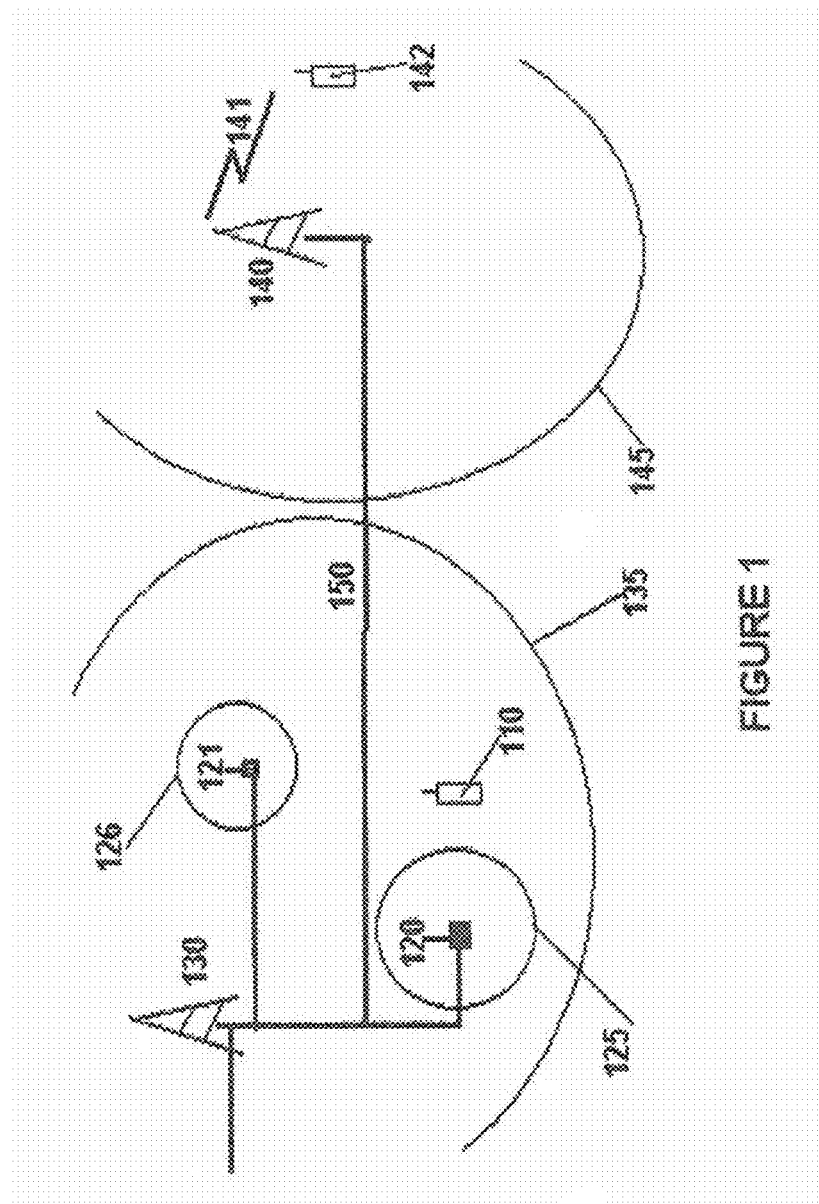
FIG. 1 illustrates an example system capable of supporting at least some embodiments of the invention.

FIG. 1 illustrates an example system capable of supporting at least some embodiments of the invention. The system comprises mobile 110, which may be a cellular telephone, personal digital assistant, PDA, cellular telephone, tablet computer or another kind of device, for example. Base stations 130 and 140 may be configured to operate according to at least one cellular standard, such as global system for mobile communication, GSM, wideband code division multiple access, WCDMA or long term evolution, LTE, for example. Base station 120 may be considered to control a cell of its own. Base stations 130 and 140 may be configured to communicate using a pre-defined band of licensed spectrum, which has been allocated by authorities for cellular communication. Base station 120 may operate according to wireless local area network, WLAN, or worldwide interoperability for microwave access, WiMAX, technologies, for example, or according to a cellular standard like cells 135 and 145, which are controlled by base stations 130 and 140, respectively. Base station 120 may be configured to control a small cell 125. Small cell 125 may be considered to be a smaller cell when compared to cells 135 and 145. Small cell 125 may operate using the same technology as cells 135 and 145, and small cell 125 may be comprised in the same network as cells 135 and 145. Base station 121 may be configured to control a further small cell 126. In the illustrated example, the cell coverage areas of small cell 125 and further small cell 126 are comprised in the cell coverage area of cell 135. Examples of small cells include femtocells and closed subscriber group, CSG, cells. In some embodiments, base stations 120 and 121 are mobile devices.

Mobiles may roam from location to location, and depending on measurements of signal strength between mobile and base station, mobiles may change from communicating with a first base station, such as base station 130, to communicating with another base station, such as base station 140. Such a change may be known as a handover or handoff. In one form of handover, known as soft handover, a mobile may change from communicating with base station 130 only to communicating with base station 130 and base station 140, for example. A set of base stations with which a mobile communicates simultaneously may be known as an active set.

Small cell 125 may be configured to provide additional coverage for a subset of users, such as premium users or emergency services users. Small cell 125 may be configured to provide services that are not available in other cells, such as cells 135 and 145. Small cell 125 may provide a location estimate to users allowed to attach to it since small cell 125 may be a relatively small cell. Calls and connections from small cell 125 may be given preferential access to taxi centres, service numbers and/or intranet/extranet services, for example. In some embodiments small cell 125 is open to all users, and the network in which it and cell 135 are comprised in may be configured to offload certain types of traffic from cell 135 to small cell 125 for users in the cell coverage area of small cell 125. Similar considerations may apply to further small cell 126. A mobile may be capable of determining that a cell is a small cell based on, for example, the radio access technology used, broadcast information from the cell indicating its size or type, indication from the network that a certain cell IDs, or ranges of cell IDs, are small cells, or an indication that a certain carrier has small cells.

Mobile 110 may be capable of communicating with at least one cellular protocol used by base stations 120, 121, 130 and/or 140. FIG. 1 illustrates further mobile 142 in wireless communication with base station 140. Wireless link 141 interconnects further mobile 142 and base station 140. Wireless link 141 may comprise a downlink for conveying information from base station 140 to further mobile 142. Wireless link 141 may comprise an uplink for conveying information from further mobile 142 to base station 140. Both uplink and downlink may convey control information and data. The uplink and/or downlink may each comprise more than one logical channel. The uplink and/or downlink may each comprise more than one physical channel. Wireless link 141 may conform to a cellular communication standard, for example. Wireless link 141 may be based on GSM, WCDMA, LTE or another standard. Wireless link 141 may be based on orthogonal frequency division multiple access, OFDMA, code division multiple access, CDMA, time divisions multiple access, TDMA, or a combination of these, for example. Wireless links between mobiles and base stations 130, 120 and 121 may be substantially similar to wireless link 141. Alternatively a network comprising base stations 120, 121, 130 and 140 may be multi-standard in the sense that base stations comprised therein do not all conform to the same radio access technology, RAT.

Base stations 120, 121, 130 and 140 are in the example system of FIG. 1 interconnected by a backbone network 150. In this example, backbone network 150 is further connected to other parts of the cellular network in which base stations 120, 121, 130 and 140 are comprised. The cellular network, or more generally the network, may comprise in addition to base stations various nodes such as switches, mobility management entities, MMEs, serving gateways, SGWs, base station controllers and the like, depending on the embodiment and type of network.

Where mobile 110, for example, is configured with an application requesting a continuously open connection, the network may be requested to keep open a connection to mobile 110 attached to the network for a period of time. A connection may comprise a bearer. A connection may comprise an uplink control channel, for example a physical uplink control channel, PUCCH. Mobile 110 and/or the network may be configured with a timer defining a length of time a connection is kept open after a data transmission on the uplink and/or downlink. Such a timer may be a release timer, for example, and it may be maintained by the network and/or mobile 110. Responsive to expiry of the release timer, in other words after the length of time defined by the timer has elapsed since a last data transmission on the uplink or downlink, the network or mobile 110 may be configured to initiate release of the open connection. Initiating release of the connection may comprise at least one of flushing at lease one retransmission buffer, initiating release of at least one channel comprised in the connection, for example a PUCCH, and clearing at least one downlink assignment or uplink grant. The connection may be caused to be released by explicit signaling, initiated by the network side or mobile 110.

Mobile 110 may be configured with a time alignment timer, TAT. The TAT defines a period of time, during which time alignment is considered to be valid. In some embodiments, time alignment refers to an understanding of a time allowance needed to account for radio propagation delay between a base station and a mobile. Responsive to expiry of a TAT a mobile will be considered to no longer have a valid time alignment. This may mean, for example, that the mobile isn't allowed to transmit in the uplink without invoking a separate random access procedure, for example. TAT may be restarted responsive to a time alignment signaling message.

Mobile 110 may be configured to set the time alignment timer to infinity, for example, to cause the time alignment to remain permanently valid despite an absence of time alignment signaling messages. This may facilitate providing the application requesting a continuously open connection with the requested continuously open connection with low latency and delay. The continuously open connection may require control information to be transmitted periodically to maintain channels comprised in the connection in an active, usable and synchronized state. For example, For example, power control, channel estimation and time synchronization need to be maintained in order for the connection to be usable when needed without additional signaling, which would entail delays.

Mobile 110 may be configured to cause control information transmission relating to a continuously open connection to become periodic with a first periodicity when there is no data being transmitted in the uplink and/or downlink. Mobile 110 may be configured to cause control information transmission relating to a continuously open connection to become periodic with a second periodicity when there is data being transmitted in the uplink and/or downlink. The first and second periodicities may be identical or different from each other. Data in this document refers to payload user or signaling data not comprising the control information used to maintain the connection. Payload signaling data may comprise, for example, radio resource control, RRC, signaling messages exchanged between mobile 110 and base station 120, for example. Mobile 110 may be configured to send the control information less frequently when the connection is not used for data transmission, and to send the control information more frequently when the connection is used for data transmission. In other words, mobile 110 may be configured to modify the periodicity of control information transmission in dependence of whether data transmission is present on the uplink and/or downlink. In some embodiments, the lower frequency of control information transmission, corresponding to an absence of data transmission, is selected so as to enable uplink time synchronization maintenance with a base station. By time uplink synchronization it is meant that the length of time it takes for signals originating from mobile 110 to reach a base station is known and indicates the time mobile 110 shall advance the uplink transmission in time.

Mobile 110 may be configured to configure the frequency of control information transmission to zero in absence of data transmission, when mobile 110 can maintain the connection even without periodic control information transmission. In other words, mobile 110 may stop sending the control information altogether when there is no data transmission. In yet further words, mobile 110 may be configured to suppress, even completely suppress, transmitting the control information in absence of data transmission. This may be possible if, for example, mobile 110 is attached to a small cell. In this case mobile 110 knows due to the attachment that uplink time synchronization is maintained, since within the cell coverage area of a small cell mobile 110 cannot move very far, in detail far enough to substantially lose the uplink time synchronization by changing the distance and thus propagation delay between mobile 110 and the base station of the small cell. Another alternative is where mobile 110 determines that it is immobile. In this case mobile 110 may not know it is attached to a small cell but is configured with an uplink timing advance that does not expire, for example by setting the TAT to infinity. When mobile 110 doesn't move, uplink time synchronization is maintained. Mobile 110 may determine it is immobile from measuring Doppler shifts in any received signals, such as broadcast signals from base stations, or from satellite positioning capabilities provided in mobile 110 such as GPS or GALILEO system support, for example. In this sense mobile 110 doesn't need to know its exact location as such, only whether it's moving since regardless of its location, the uplink time synchronization will be maintained as long as mobile 110 is immobile.

Examples of the control information described above include channel quality indicator, CQI, information, sounding reference signal, SRS, information and channel state information, CSI, information, which may comprise CQI, precoding matrix index, PMI, rank indicator, RI, and/or precoding type indicator, PTI, information. CQI information describes to the network a quality of a received downlink signal. SRS information relates to uplink scheduling, and is unnecessary as such in the absence of scheduled data.

In some embodiments, mobile 110 takes into use suppression of control information transmission in absence of data responsive to receiving signaling from the network instructing the mobile so. In other embodiments, mobile 110 is configured at the factory, by a user or by an operator to suppress control information transmission in absence of data when feasible without explicit instructions from the network to start the suppressing.

When mobile 110 suppresses the transmission of control information, the suppression may last as long as the absence of data lasts. Responsive to determining that the user of mobile 110 initiates actions that require data transmission, mobile 110 may be configured to cease suppressing the transmission of control information. Likewise, responsive to receiving signaling from the network informing mobile 110 of incoming downlink data, mobile 110 may be configured to cease suppressing the transmission of control information. In some embodiments, mobile 110 is configured to receive from the network a signaling message, wherein the signaling message is configured to disable the suppression of control information transmission. Mobile 110 may responsively resume periodic control information transmissions even in the absence of data transmission In some embodiments, mobile 110 is configured to take control information transmission suppression in the absence of data transmission into use responsive to attaching to a small cell. Subsequently mobile 110 may disable the suppression in connection with a handover from the small cell to a macro cell, by which it is meant a cell that is not a small cell. In some embodiments mobile 110 is configured to take control information transmission suppression in the absence of data transmission into use responsive to at least one enabling trigger being present. Examples of enabling triggers may comprise attachment to a small cell, network configuration, broadcast information, availability of location or movement estimation from satellite positioning and availability of location or movement estimation from radio measurements.

In an example LTE system, discontinuous reception, DRX, operation is standardized. (TS 36.321, Section 5.7). Standards define Active Time when a user equipment, UE, shall monitor a downlink, DL, control channel, for example a physical downlink control channel, PDCCH, for possible DL assignments and uplink, UL, grants. Active Time is defined by several timers, among others an on Duration timer which is started periodically, the periodicity being defined by long and short DRX cycles, and DRXinactivityTimer which is started when downlink control channel data indicating allocation for a new transmission is received. Control information such as, for example, CQI and/or SRS may be in some embodiments only be transmitted when a UE is in Active Time, and correspondingly not when a UE is allowed to sleep, during which there is no need to monitor the physical downlink control channel. For CQI, it is possible to configure such that CQI is transmitted only when on Duration timer is running. Thus CQI and SRS transmissions may be suppressed when UE is in Active Time outside on Duration. The present invention proposes in some embodiments to suppress CQI and SRS transmissions further if no data is received or transmitted during Active Time, for example during on Duration, when an inactivity time is not running (with no data DRXinactivityTimer is not started), thus further reducing the power consumption when there is no data transmission/reception.

In general there is provided an apparatus, for example mobile 110 or a control device for inclusion in mobile 110. The apparatus may comprise a transmitter configured to transmit control information on an uplink. Where the apparatus corresponds to mobile 110, the transmitter may comprise a radio transmitter or radio transceiver of mobile 110. Where the apparatus corresponds to a control device, for example an integrated chip or chipset for inclusion in mobile 110, the transmitter may comprise an input/output pin, for example, of the control device, configured to provide the control information to a radio transceiver comprised in mobile 110 for transmission on the uplink. The control information may be conveyed from the control device to a radio transceiver via internal signaling inside mobile 110.

The apparatus may further comprise at least one processing core configured to control the transmission of uplink control information, wherein the at least one processing core is configured to suppress the transmission responsive to an absence of user data transmission, wherein the suppression occurs while a connection is being maintained in an active state in the sense that a time alignment pertaining to the connection remains valid. In an embodiment, active state refers to a state where both Active Time and on Duration are running. Where the apparatus corresponds to mobile 110, the at least one processing core may be comprised in at least one processor, chipset, field-programmable gate array or other control device comprised in mobile 110. Where the apparatus corresponds to a control device for inclusion in mobile 110, the control device may comprise at least one processing core configured to control the functioning of the control device and mobile 110. The at least one processing core may be configured to suppress the transmission responsive to an absence of user data transmission on the uplink or downlink. The user data does not comprise the control information.

In some embodiments, the at least one processing core is configured to suppress the transmission responsive to an absence of user data when the apparatus is at least one of attached to a small cell, in possession of location data indicating immobility or in possession of movement data indicating immobility. Immobility may refer to immobility of the apparatus. As described above, time alignment can be maintained without uplink control information transmission where it is known that the mobile doesn't move much or the cell size is small enough. In this sense, the at least one processing core can use as an enabling trigger for the suppression information that allows the mobile to determine it is relatively immobile. In this sense, the trigger in the two latter cases is that the mobile determines based on the location or mobility data or cell size that the mobile is relatively immobile. By relative immobility it is meant that the degree of mobility is less than a degree of mobility capable of breaking uplink time alignment. The mobile may store a threshold value describing the degree of mobility capable of breaking time alignment and the mobile may be configured to compare the determined degree of mobility to the threshold value. The location data and movement data, or cell size, may indicate immobility directly or indirectly, wherein by indirect indication it is meant that the location or movement data or cell size enable the mobile to determine, based on the location or movement data or cell size, that the mobile is relatively immobile.

In some embodiments, the apparatus is configured to enable the suppression in absence of user data responsive to a signaling message received from a network, the signaling message instructing the apparatus to enable the suppression. The signaling message may comprise a configuration object or RRC message, for example.

In some embodiments, suppressing comprises completely suppressing, in other words not transmitting even periodically.

In some embodiments, when the uplink control information transmission is not suppressed the uplink control information is transmitted periodically. The periodicity may be modified dynamically by the at least one processing core, in dependence of operating conditions such as, for example, presence or absence of user data transmission. The periodicity may also be modified based on a type of user data transmitted.

In some embodiments, the uplink control information comprises at least one of a channel quality indicator and a sounding reference signal. On other embodiments the uplink control information may be described using different terminology, in general the uplink control information may be information usable to maintain time alignment or similar relating to the active connection.

In some embodiments, in addition to suppressing the transmission in the absence of user data transmission, the at least one processing core is also configured to suppress the transmission responsive to an absence of signaling payload data in an uplink or downlink. In other words, in these embodiments the transmission is suppressed when there is no user data or signaling payloads being transmitted in either uplink or downlink. Signaling payload may comprise the contents of RRC messages, for example, for re-configuring certain aspects of the active connection. Signaling payload may also comprise re-authentication challenges and responses, for example. Signaling payload does not comprise the uplink control information used to maintain the active connection. Signaling payload may be seen, for example, as layer 3 signaling, whereas the control information may be considered to be on layer 1 according to an open systems interconnection, OSI, layer model.

Figure 3:
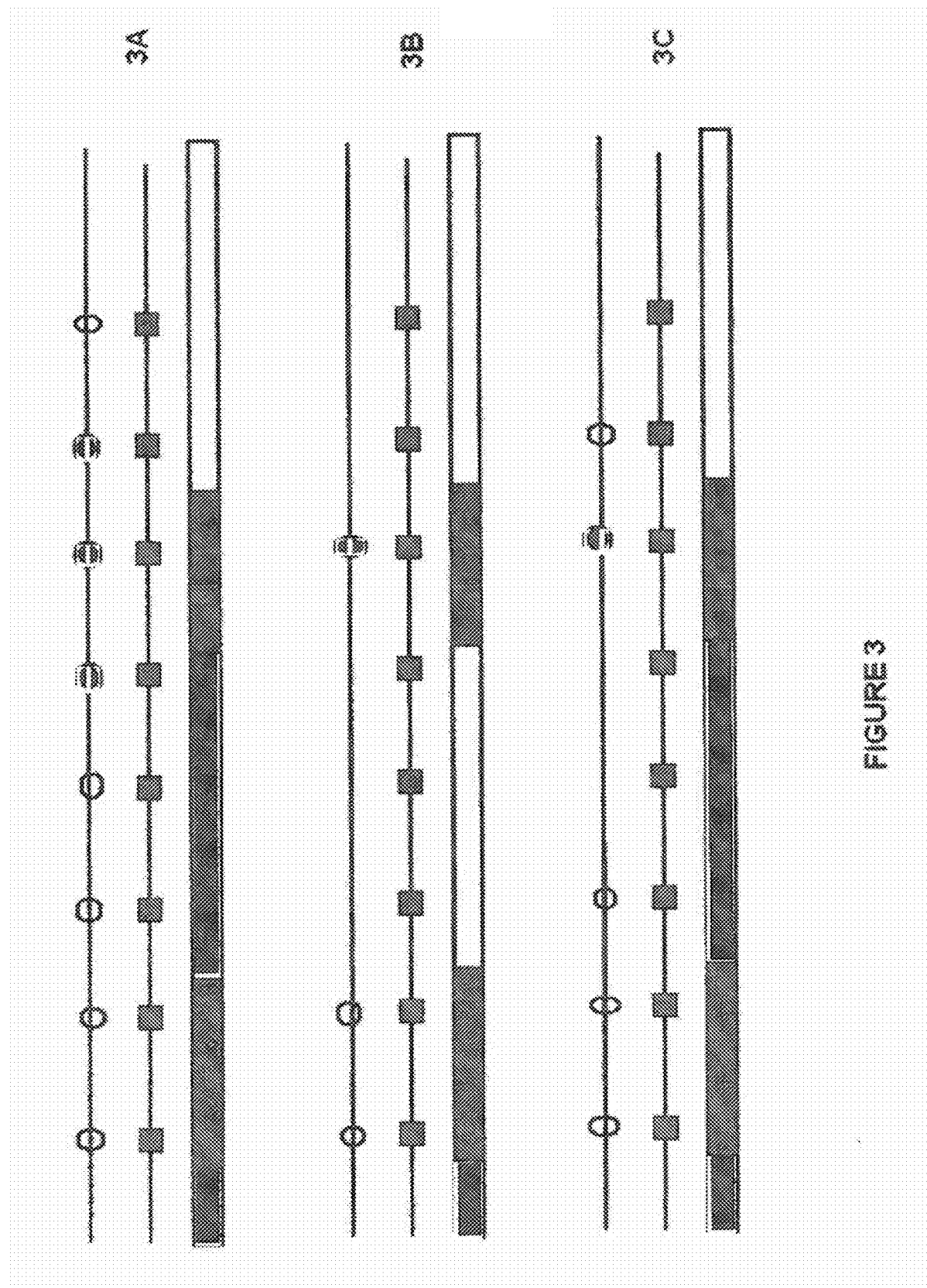
FIG. 3 illustrates transmission timings of uplink control information relative to user data transmission.

In general, there may be provided a second apparatus, such as for example a base station or base station controller. The second apparatus is configured, by software operating on at least one processor comprised in the second apparatus, to transmit a signaling message to a user equipment, the signaling message being configured to cause the user equipment to suppress or cease suppressing transmission of uplink control information responsive to an absence of user data to be transmitted from or to the user equipment, wherein the second apparatus is configured to transmit the signaling message responsive to configuration information indicating the apparatus is at least one of a base station of a small cell and a base station controller of a small cell FIG. 3 illustrates transmission timings of uplink control information relative to user data transmission. Turning first to FIG. 3A at the top, FIG. 3A comprises three horizontal elements. The lowest horizontal element of FIG. 3A, a rectangular black-and-white element, illustrates the air interface for data traffic, where area coloured black corresponds to user data and/or signaling payload data transmission and white to absence of data transmission. Time increases from left to right. The horizontal element in the middle of FIG. 3A, a black line, displays as black squares on the black line time instances where periodic uplink control information is scheduled to be sent. The black squares may also indicate expiry and/or restart of an on Duration timer. The topmost horizontal element, a black line, marks with circles those of the time instances when uplink control information is actually sent. In FIG. 3A, suppression of uplink control information transmission isn't in use and the uplink control information is transmitted in each scheduled time instant. It may be that the mobile of FIG. 3A isn't in a small cell, or suppression has been switched off with network-originated signaling.

Turning now to FIG. 3B, we can observe from the circles on the topmost horizontal black line that uplink control information is only transmitted during those scheduled time instances which coincide with data transmission on the air interface. In other words, many of the scheduled time instances pass with no uplink control information being transmitted, meaning that those transmissions have been suppressed.

Turning now to FIG. 3C, we see an embodiment which resembles that illustrated in FIG. 3B, except that in addition to the transmissions illustrated in FIG. 3B, also the first scheduled time instants following a data transmission in uplink or downlink is used for transmitting uplink control information. This can be generalized such that two or N scheduled instants following a data transmission in uplink or downlink are used for transmitting uplink control information. This embodiment is beneficial if the gap between data transmissions/receptions is small because then network has better knowledge of the channel quality when scheduling the new data burst. A benefit of this embodiment is that for some traffic burst types, the additional uplink control information transmission may be beneficial as otherwise the system may suffer from inadequate uplink control information.

FIG. 4 is a flowchart of a method in accordance with an example embodiment of the invention. In phase 410, a user equipment such as, for example, mobile 110 transmits uplink control information. This transmission may coincide in time with user data transmission in the uplink or downlink. Alternatively, it may coincide in time with signaling payload data transmission in the uplink or downlink. In phase 420, the transmission of the user data or the signaling payload data ceases. Responsive to phase 420, in phase 430 the transmission of uplink control information is suppressed, for example by a processor comprised in the user equipment. In phase 440 the transmission of data, which may be user data as illustrated in FIG. 4 or signaling payload data, resumes. Responsive to phase 440, processing advances to phase 410 where the transmission of uplink control information resumes.

Figure 2:
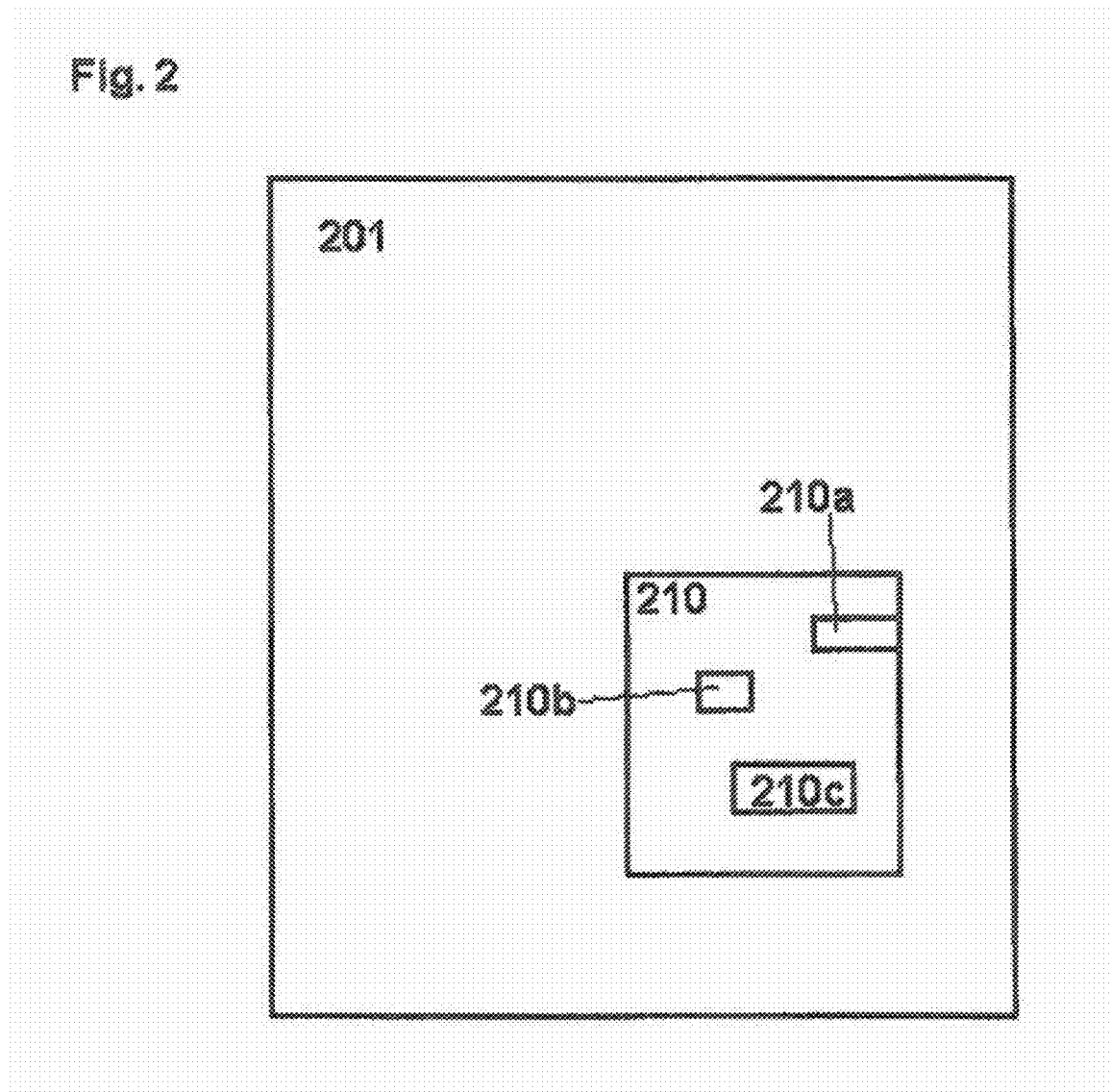
FIG. 2 illustrates an example apparatus capable of supporting at least some embodiments of the present invention.

FIG. 2 illustrates an example apparatus 201 capable of supporting at least some embodiments of the present invention. The apparatus may correspond to mobile 110, or base station 120, for example, or to a chipset. The apparatus is a physically tangible object, for example a mobile telephone, personal digital assistant, data dongle or a similar device. The apparatus may comprise a control apparatus 210, for example a microprocessor, digital signal processing, DSP, processor, field-programmable gate array, FPGA, application-specific integrated circuit, ASIC, chipset or controller. The apparatus may further comprise a transmitter and/or a receiver 210a configured to enable the apparatus 201 to connect to other apparatuses. A combination of transmitter and receiver may be called a transceiver. The apparatus may comprise memory 210b configured to store information, for example configuration information. The memory may be solid-state memory, dynamic random access memory, DRAM, magnetic, holographic or other kind of memory. The apparatus may comprise logic circuitry 210c configured to access the memory 210b and control the transmitter and/or a receiver 210a. The logic circuitry 210c may be implemented as hardware or a combination of software and hardware. The logic circuitry 210c may comprise at least one processing core. The logic circuitry 210c may execute program code stored in memory 210b to control the functioning of the apparatus 201 and cause it to perform functions related to embodiments of the invention. The logic circuitry 210c may be configured to initiate functions in the apparatus 201, for example the sending of data units via the transmitter and/or a receiver 210a. The logic circuitry 210c may be control circuitry. The transmitter and/or a receiver 210a, memory 210b and/or logic circuitry 210c may comprise hardware and/or software elements comprised in the control apparatus 210. Memory 210b may be comprised in the control apparatus 210, be external to it or be both external and internal to the control apparatus 210 such that the memory is split to an external part and an internal part. If the apparatus 201 does not comprise a control apparatus 210 the transmitter and/or a receiver 210a, memory 210b and logic circuitry 210c may be comprised in the apparatus as hardware elements such as integrated circuits or other electronic components. The same applies if the apparatus 201 does comprise a control apparatus 210 but some, or all, of the transmitter and/or a receiver 210a, memory 210b and logic circuitry 210c are not comprised in the control apparatus 210. In embodiments where apparatus 201 is a mobile user equipment, apparatus 201 may comprise at least one antenna.

Without in any way limiting the scope, interpretation, or application of the claims appearing below, a technical effect of one or more of the example embodiments disclosed herein is that battery resources in a mobile device are conserved since less unnecessary uplink control information is transmitted. Another technical effect of one or more of the example embodiments disclosed herein is that air interface interference is avoided since less unnecessary uplink control information is transmitted.

Embodiments of the present invention may be implemented in software, hardware, application logic or a combination of software, hardware and application logic. The software, application logic and/or hardware may reside on memory 210b, the control apparatus 210 or electronic components, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
a transmitter configured to transmit uplink control information; and
at least one processing core configured to control the transmission of uplink control information, wherein the at least one processing core is configured to suppress the transmission responsive to an absence of user data transmission, wherein the suppression occurs while a connection is being maintained in an active state, wherein the at least one processing core is configured to suppress the transmission responsive to an absence of uplink user data when the apparatus is at least one of attached to a small cell, in possession of location data indicating immobility or in possession of movement data indicating immobility.

2. The apparatus according to claim 1, wherein the apparatus is configured to receive a signaling message from a network, the signaling message being configured to enable the uplink control information transmission suppression.

3. The apparatus according to claim 1, wherein suppressing comprises completely suppressing.

4. The apparatus according to claim 1, wherein the uplink control information comprises periodic uplink control information.

5. The apparatus according to claim 1, wherein the uplink control information comprises at least one of a channel quality indicator and a sounding reference signal.

6. The apparatus according to claim 1, wherein the at least one processing core is configured to suppress the transmission responsive to an absence of signaling payload data on an uplink or downlink.

7. The apparatus according to claim 1, wherein the apparatus comprises a mobile communication device, the apparatus further comprising an antenna coupled to a radio receiver comprised in the apparatus, and configured to provide signals to the at least one processing core.

8. A method, comprising:
transmitting uplink control information; and
controlling the transmission of uplink control information, wherein controlling comprises suppressing the transmission responsive to an absence of user data transmission, wherein the suppression occurs while a connection is being maintained in an active state, wherein the transmission is suppressed responsive to an absence of user data transmission and an apparatus performing the method being at least one of attached to a small cell, in possession of location data indicating immobility or in possession of movement data indicating immobility.

9. The method according to claim 8, comprising receiving a signaling message from a network, the signaling message being configured to enable the uplink control information transmission suppression.

10. The method according to claim 8, wherein the uplink control information comprises periodic uplink control information.

11. The method according to claim 8, comprising setting a time alignment timer to infinity.

12. An apparatus, comprising:
at least one processor; and
at least one memory including computer program code
the at least one memory and the computer program code configured to, with the at least one processor, cause the apparatus to perform at least the following:
transmit a signaling message to a user equipment, the signaling message being configured to cause the user equipment to suppress or cease suppressing transmission of uplink control information responsive to an absence of user data to be transmitted from or to the user equipment, and
wherein the apparatus is configured to transmit the signaling message responsive to configuration information indicating the apparatus is at least one of a base station of a small cell and a base station controller of a small cell.

13. A non-transitory computer readable medium having stored thereon a set of computer readable instructions that, when executed by at least one processor, cause an apparatus to at least:
transmit uplink control information, and
control the transmission of uplink control information, wherein controlling comprises suppressing the transmission responsive to an absence of user data transmission, wherein the suppression occurs while a connection is being maintained in an active state, wherein the transmission is suppressed responsive to an absence of user data transmission and the apparatus being at least one of attached to a small cell, in possession of location data indicating immobility or in possession of movement data indicating immobility.

* * * * *